(12) United States Patent  
Okita

(10) Patent No.: US 12,019,359 B2  
(45) Date of Patent: Jun. 25, 2024

(54) LIGHT BLOCKING MEMBER AND PROJECTION VIDEO DISPLAY DEVICE

(71) Applicant: Panasonic Intellectual Property Management Co., Ltd., Osaka (JP)

(72) Inventor: Tetsuya Okita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 420 days.

(21) Appl. No.: 17/518,028

(22) Filed: Nov. 3, 2021

(65) Prior Publication Data

US 2022/0057698 A1 Feb. 24, 2022

Related U.S. Application Data

(63) Continuation of application No. PCT/JP2020/029264, filed on Jul. 30, 2020.

(30) Foreign Application Priority Data

Aug. 2, 2019 (JP) ................................ 2019-142976

(51) Int. Cl.
 *G03B 21/16* (2006.01)
 *G03B 21/20* (2006.01)
 *G03B 21/14* (2006.01)

(52) U.S. Cl.
 CPC .......... *G03B 21/16* (2013.01); *G03B 21/2066* (2013.01); *G03B 21/14* (2013.01)

(58) Field of Classification Search
 CPC ............................ G03B 21/16; G03B 21/2066
 See application file for complete search history.

(56) References Cited

U.S. PATENT DOCUMENTS 6,179,424 B1 * 1/2001 Sawamura ......... G02B 26/0841  
                                                               348/771  
6,185,047 B1 * 2/2001 Peterson .............. H04N 9/3114  
                                                            348/E5.142

(Continued)

FOREIGN PATENT DOCUMENTS

JP      2003-121784      4/2003  
JP      2005-284120     10/2005

(Continued)

OTHER PUBLICATIONS

International Search Report dated Oct. 20, 2020 in corresponding International Application No. PCT/JP2020/029264.

*Primary Examiner* — Bao-Luan Q Le  
(74) *Attorney, Agent, or Firm* — Wenderoth, Lind & Ponack, L.L.P.

(57) ABSTRACT

A light blocking member according to the present disclosure is for a projection video display device provided with an optical system that projects video light and a projection lens on which the video light is incident, the light blocking member being disposed between the optical system and the projection lens, the light blocking member including: a first light blocking portion that absorbs and converts into heat a part of unnecessary light unnecessary for the projection lens in the video light; and a reflector that reflects, as reflected light, light that is a part of the unnecessary light and that is not absorbed by the first light blocking portion.

9 Claims, 15 Drawing Sheets

(56) References Cited

U.S. PATENT DOCUMENTS

| | | | |
|---|---|---|---|
| 6,357,878 B1* | 3/2002 | Sawamura | G03B 21/008 |
| | | | 348/771 |
| 7,149,041 B2* | 12/2006 | Hsu | H04N 5/7458 |
| | | | 348/E5.142 |
| 7,475,991 B2* | 1/2009 | Ma | G02B 27/145 |
| | | | 349/9 |
| 7,708,412 B2* | 5/2010 | Lee | G02B 26/0833 |
| | | | 353/81 |
| 7,896,501 B2* | 3/2011 | Huang | G03B 21/16 |
| | | | 353/56 |
| 9,900,563 B2* | 2/2018 | Terada | G03B 21/16 |
| 10,459,322 B2* | 10/2019 | Kase | G02B 5/003 |
| 10,564,532 B2* | 2/2020 | Terada | H04N 5/74 |
| 11,036,119 B2* | 6/2021 | Tsai | G03B 21/2033 |
| 11,256,164 B2* | 2/2022 | Fu | H04N 9/31 |
| 11,287,733 B2* | 3/2022 | Hsu | G03B 21/2066 |
| 2005/0231972 A1 | 10/2005 | Saegusa | |
| 2005/0237620 A1* | 10/2005 | Hsu | H04N 5/7458 |
| | | | 348/E5.142 |
| 2007/0035701 A1* | 2/2007 | Lee | H04N 9/3114 |
| | | | 353/97 |
| 2007/0146644 A1* | 6/2007 | Ma | H04N 9/3144 |
| | | | 353/20 |
| 2007/0195417 A1* | 8/2007 | Yamamoto | H04N 9/3114 |
| | | | 359/590 |
| 2008/0174745 A1* | 7/2008 | Robitaille | G03B 21/28 |
| | | | 353/85 |
| 2009/0213339 A1* | 8/2009 | Huang | G03B 21/16 |
| | | | 353/52 |
| 2014/0071405 A1 | 3/2014 | Chen et al. | |
| 2015/0381952 A1 | 12/2015 | Yusa et al. | |
| 2016/0349604 A1* | 12/2016 | Okuno | G03B 21/008 |
| 2018/0020196 A1* | 1/2018 | Terada | G03B 21/2066 |
| 2018/0239225 A1* | 8/2018 | Zhong | G02B 26/0833 |
| 2018/0275497 A1* | 9/2018 | Kase | G02B 5/003 |
| 2019/0094675 A1* | 3/2019 | Terada | G03B 21/2066 |
| 2020/0314392 A1* | 10/2020 | Hsu | H04N 9/3141 |
| 2021/0124245 A1* | 4/2021 | Tsai | G03B 21/008 |
| 2021/0286239 A1* | 9/2021 | Fu | G03B 21/142 |

FOREIGN PATENT DOCUMENTS

| | | |
|---|---|---|
| JP | 2007-322535 | 12/2007 |
| JP | 2008-32901 | 2/2008 |
| JP | 2011-158862 | 8/2011 |
| JP | 2011-221277 | 11/2011 |
| JP | 2011-248174 | 12/2011 |
| JP | 2012-164508 | 8/2012 |
| JP | 2013-225018 | 10/2013 |
| JP | 2016-12003 | 1/2016 |

* cited by examiner

LIGHT BLOCKING MEMBER AND PROJECTION VIDEO DISPLAY DEVICE

TECHNICAL FIELD

The present disclosure relates to a light blocking member for a projection-type video display device, and a projection video display device.

BACKGROUND ART

A projection video display device includes an illumination optical system that converts light beams from a light source device into illumination light, and a projection optical system that converts the illumination light into video light and projects the video light.

In the projection video display device, a part of the light beams from the light source device and light beams passing through the projection optical system are unnecessary light that is not used for video projection. When a housing of the projection video display device, another device member, or the like is irradiated with unnecessary light, deterioration due to light or heat may be caused. In addition, unnecessary light may be reflected or scattered to generate stray light, and the stray light may be projected together with video light, leading to deterioration in video quality.

For example, PTL 1 provides a light source device that suppresses deterioration caused by a light flux. The light source device according to PTL 1 includes a light blocking film that blocks unnecessary light. The light blocking film is formed of a black material having low reflectance. It blocks unnecessary light, and absorbs and converts unnecessary light into heat, thereby suppressing deterioration of the device and generation of stray light. However, unnecessary light absorbed by the light blocking film and converted into heat locally increases the temperature of the light blocking film, so that the overheated light blocking film or peripheral members may be deteriorated.

PTL 2 discloses an illumination device capable of satisfactorily projecting image information by reducing temperature rise of a light blocking unit disposed in an illumination light path. The illumination device disclosed in PTL 2 includes: a light source unit; an illumination optical system that guides a light flux emitted from the light source unit to an irradiated surface side; an optical box that houses the illumination optical system; a light blocking unit that can be inserted into and removed from an illumination light path in the optical box; and a holding member that holds the light blocking unit. The light blocking unit includes a light blocking portion that reflects an incident light flux. The light blocking portion includes a metal material having a reflectance of 80% or more with respect to a light flux having a wavelength of 550 nm, and the holding member includes a heat dissipator that extends to an outside of the optical box.

CITATION LIST

Patent Literature

PTL 1: Unexamined Japanese Patent Publication No. 2011-248174

PTL 2: Unexamined Japanese Patent Publication No. 2011-221277

SUMMARY OF THE INVENTION

The present disclosure provides a light blocking member and a projection-type video display device capable of reducing stray light while enhancing heat dissipation as compared with the related art.

The light blocking member according to the present disclosure is a light blocking member for a projection video display device including an optical system that projects video light and a projection lens on which the video light is incident. The light blocking member disposed between the optical system and the projection lens includes a first light blocking portion that absorbs and converts into heat a part of unnecessary light unnecessary for the projection lens in the video light, and a reflector that reflects, as reflected light, light that is a part of the unnecessary light and that is not absorbed by the first light blocking portion.

According to the light blocking member and the like of the present disclosure, it is possible to reduce stray light while enhancing heat dissipation as compared with the related art.

DESCRIPTION OF EMBODIMENTS

Figure 1:
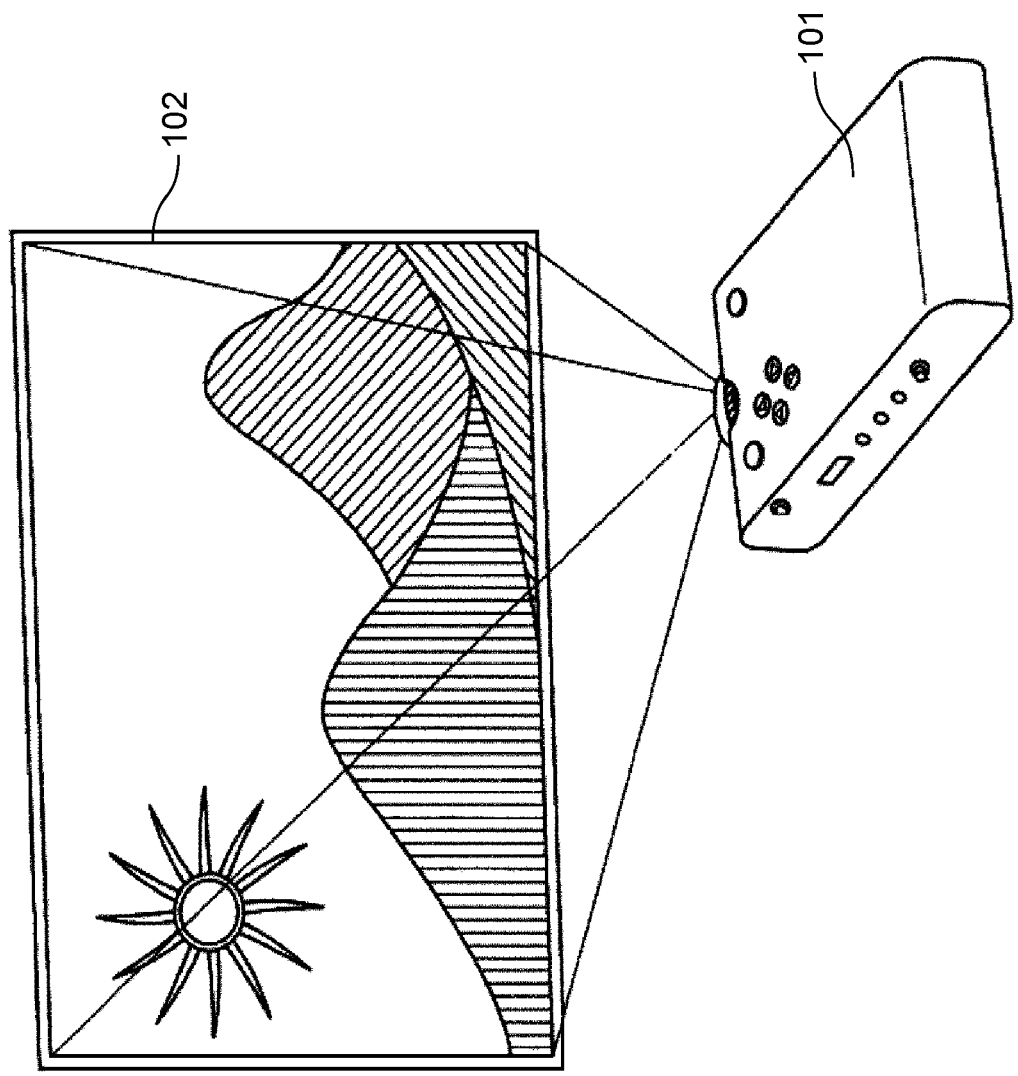
FIG. 1 is a perspective view illustrating an example of an appearance of a projection video display device according to a first exemplary embodiment.

Exemplary embodiments will be described in detail below with reference to the drawings as appropriate. However, detailed description more than necessary may be sometimes omitted. For example, the detailed description of already well-known matters and the overlap description of substantially the same configurations may be omitted. This is to avoid an unnecessarily redundant description below and to facilitate understanding of a person skilled in the art.

Note that the inventor provides the attached drawings and the following description to help those skilled in the art fully understand the present disclosure, and does not intend to limit the subject matter as described in the appended claims.

In addition, it should be noted that the drawings are schematic, and ratios of dimensions and the like are different from actual ones. Therefore, specific dimensions, etc. should be understood in view of the following description. In addition, in the drawings, dimensional relationships and ratios may differ from one another.

First Exemplary Embodiment

A first exemplary embodiment will be described below with reference to FIGS. 1 to 6. FIG. 1 is a perspective view illustrating an example of an appearance of projection video display device 101 according to the first exemplary embodiment. As illustrated in FIG. 1, projection video display device 101 projects video 102 by projecting video light generated according to an input video signal onto a screen.

Figure 2:
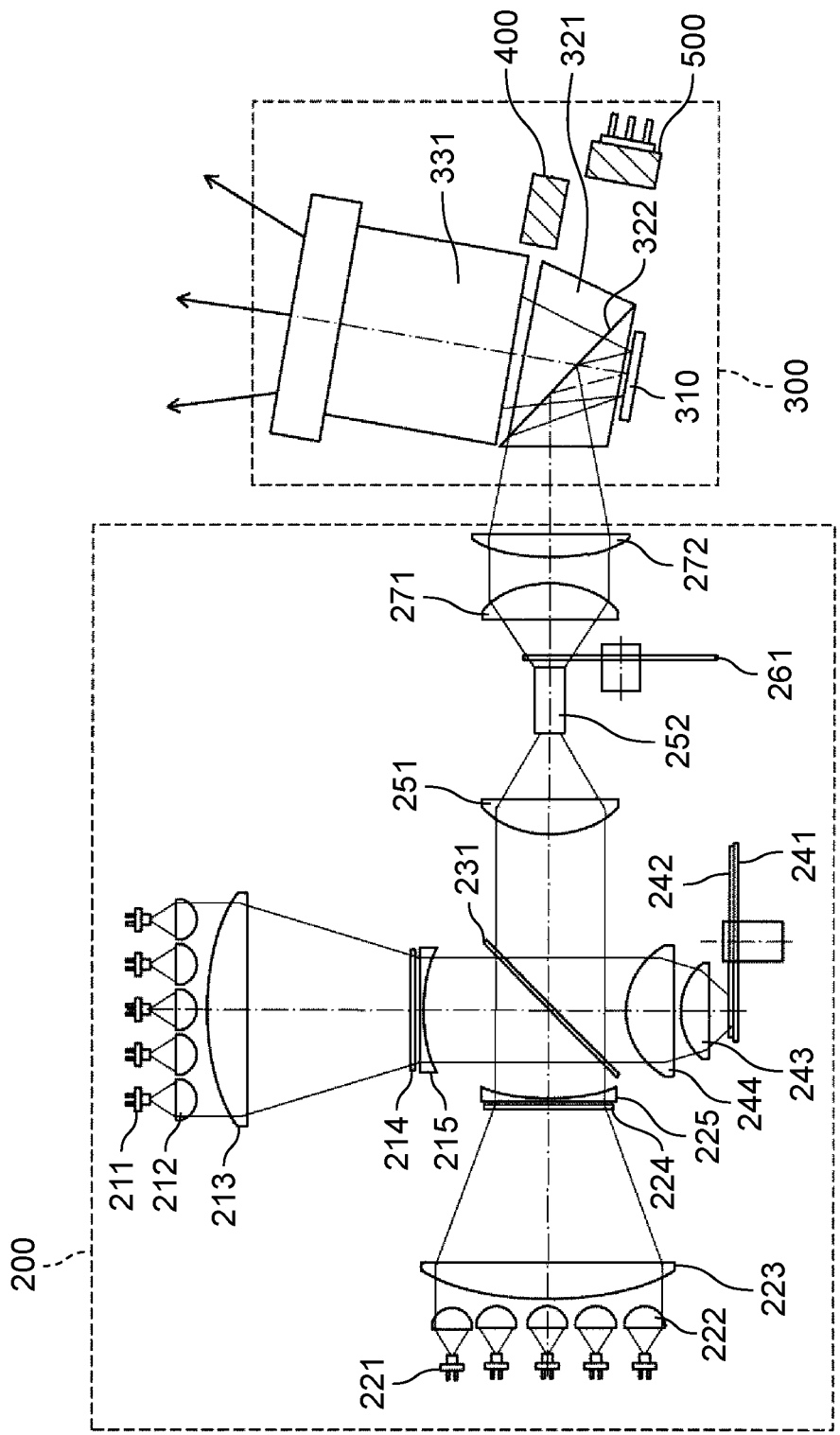
FIG. 2 is a block diagram illustrating a detailed configuration example of the projection video display device in FIG. 1.

FIG. 2 is a block diagram illustrating a detailed configuration example of projection video display device 101 in FIG. 1. In FIG. 1, projection video display device 101 includes illumination optical system 200 and projection optical system 300. Illumination optical system 200 includes a plurality of blue laser light sources 211 and 221, a plurality of collimator lenses 212 and 222, convex lenses 213, 223, 243, 244, 251, 271, and 272, diffusion plates 214 and 224, concave lenses 215 and 225, dichroic mirror 231, rod integrator 252, phosphor wheel 241, and color wheel 261.

In FIG. 2, the plurality of blue laser light sources 211 and 221 generates blue laser light. Blue laser light from the plurality of blue laser light sources 211 is collimated by collimator lens 212, then condensed by convex lens 213, and enters diffusion plate 214 as blue light. Diffusion plate 214 uniformizes input blue light. The uniformized blue light is collimated by concave lens 215, and then, enters dichroic mirror 231.

Dichroic mirror 231 transmits light having a wavelength of blue laser light and reflects light having other wavelengths. Dichroic mirror 231 is disposed so as to be inclined at 45 degrees with respect to the optical axis of the blue laser light from blue laser light sources 211. Therefore, the blue light collimated by concave lens 215 is transmitted through dichroic mirror 231 and condensed by convex lenses 244 and 243. The condensed blue light enters wavelength conversion element 242 of phosphor wheel 241.

Wavelength conversion element 242 is disposed with a predetermined width on a circumference concentric with phosphor wheel 241, and is divided into a plurality of phosphor regions having different predetermined excitation characteristics. Phosphor wheel 241 is rotated by a motor or the like, so that a region on which blue light is incident among the plurality of phosphor regions is selectively switched in a time division manner. The plurality of phosphor regions is excited by the incidence of blue light, generates, for example, red and green fluorescent light according to the excitation characteristic of each phosphor region, and projects the fluorescent light toward convex lens 243.

The fluorescent light from phosphor wheel 241 is collimated by convex lenses 243 and 244, and then, enters dichroic mirror 231 again. As described above, dichroic mirror 231 has a spectral characteristic of reflecting light having red and green wavelengths, and is disposed to be inclined at 45 degrees with respect to the optical axis of fluorescent light. Therefore, dichroic mirror 231 reflects the fluorescent light by bending the fluorescent light by 90 degrees toward convex lens 251.

On the other hand, blue laser light from the plurality of blue laser light sources 221 is collimated by collimator lens 222 and condensed by convex lens 223. The condensed blue laser light is collimated by concave lens 225, passes through dichroic mirror 231, and enters convex lens 251 in the same direction as the fluorescent light. Convex lens 251 condenses blue light from blue laser light sources 221 and fluorescent light from phosphor wheel 241, and projects the condensed blue light and fluorescent light onto rod integrator 252.

Rod integrator 252 uniformizes the incident light by repeated total reflection, and projects the light onto a color filter (not illustrated) of color wheel 261. The color filter is disposed with a predetermined width on a circumference concentric with color wheel 261, and is divided into a plurality of color filter regions. Each color filter region transmits only light of the incident light having a predetermined wavelength. Color wheel 261 is rotated by a motor or the like, so that a region on which light from rod integrator 252 is incident among the plurality of color filter regions is selectively switched in a time division manner. The plurality of color filter regions includes, for example, a region that transmits only red light, a region that transmits only green light, a region that transmits only blue light, and a region that transmits incident light without any change.

The light from rod integrator 252 passes through the color filter of color wheel 261, is condensed by convex lenses 271 and 272, and is projected onto projection optical system 300 as illumination light. The illumination light includes blue light from blue laser light sources 221 and fluorescent light from phosphor wheel 241. Phosphor wheel 241 and color wheel 261 rotate at the same cycle. In addition, the plurality of phosphor regions and the plurality of color filter regions are provided at an area ratio such that, on average per period of one cycle, the illumination light becomes white light.

Projection optical system 300 includes digital mirror device (DMD) 310, total internal reflection prism 321, projection lens 331, and light blocking plate 400 (light blocking member). Total internal reflection prism 321 includes two prisms combined with small gap 322 therebetween, and reflects the illumination light from illumination optical system 200 toward DMD 310.

DMD 310 reflects a part of the incident illumination light toward projection lens 331, and a part of the reflected light enters light blocking plate 400. Projection lens 331 adjusts an amount of reflected light from DMD 310 by a diaphragm, and projects the reflected light toward a screen as video light. A region of projection lens 331 where the incident light is projected as video light without being blocked by the diaphragm is referred to as an entrance pupil of projection lens 331. In other words, projection lens 331 projects light, which enters the entrance pupil of projection lens 331, of the reflected light from DMD 310 onto the screen as video light to display video 102.

Here, when entering a region other than the entrance pupil of projection lens 331, the reflected light from DMD 310 repeats reflection and scattering by the abovementioned diaphragm or the like, and is converted into stray light traveling in an unintended direction. When stray light from projection lens 331 is applied to another device member or housing (not shown), photodegradation, thermal degradation, deformation, and the like of the device member or the housing may occur. In addition, there is a possibility that stray light enters the entrance pupil of projection lens 331 and is projected together with video light. This deteriorates the quality of the video, and impairs good display of the video on projection video display device 101. In order to prevent the generation of such stray light, light blocking plate 400 blocks light reflected from DMD 310 toward projection lens 331 and reflected toward the region other than the entrance pupil of projection lens 331, and reflects a part of the blocked light toward heat dissipation plate 500. Light blocking plate 400 also absorbs light which has not been reflected and converts the same into heat.

Figure 3:
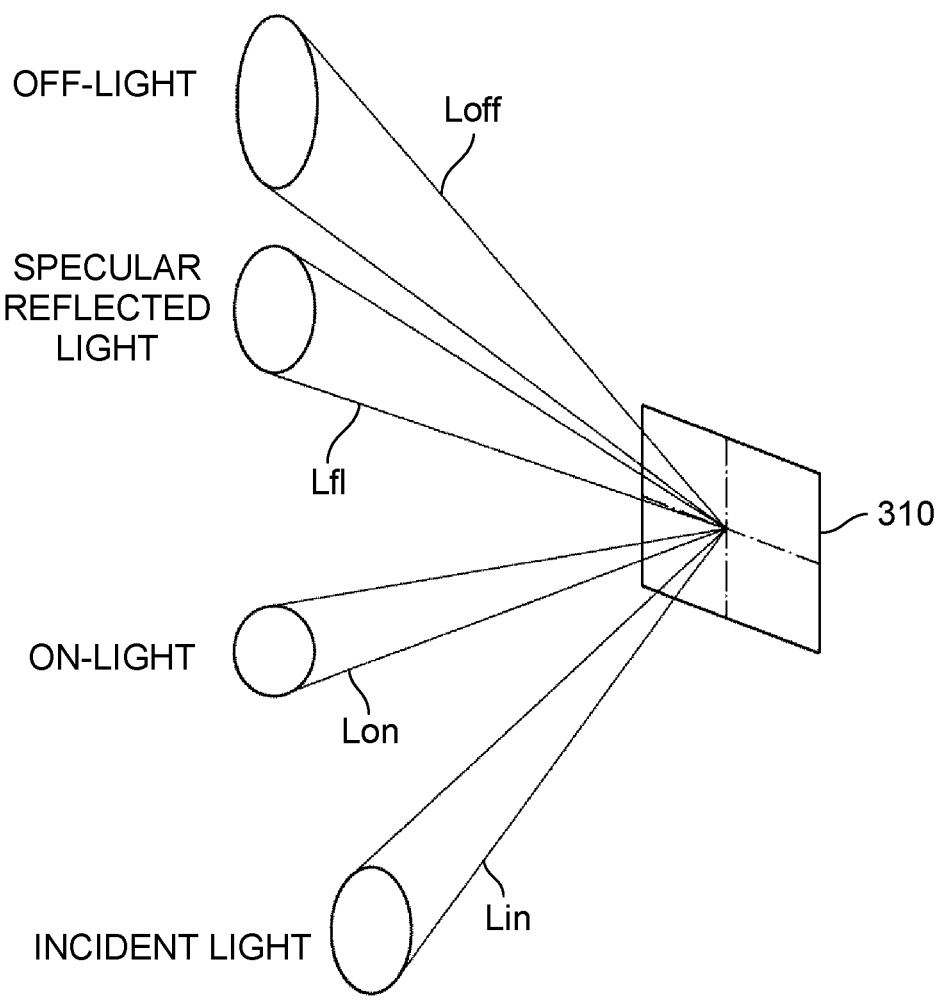
FIG. 3 is a perspective view illustrating a relationship between incident light and reflected light in a digital mirror device (DMD) in FIG. 2.

FIG. 3 is a perspective view illustrating a relationship between incident light and reflected light in DMD 310 in FIG. 2. As illustrated in FIG. 3, incident light incident on a certain point of DMD 310 is reflected in different directions as reflected light such as on-light Lon, off-light Loff, or specular reflected light Lfl according to a state of DMD 310 at the certain point (this will be described in detail later).

Figure 4:
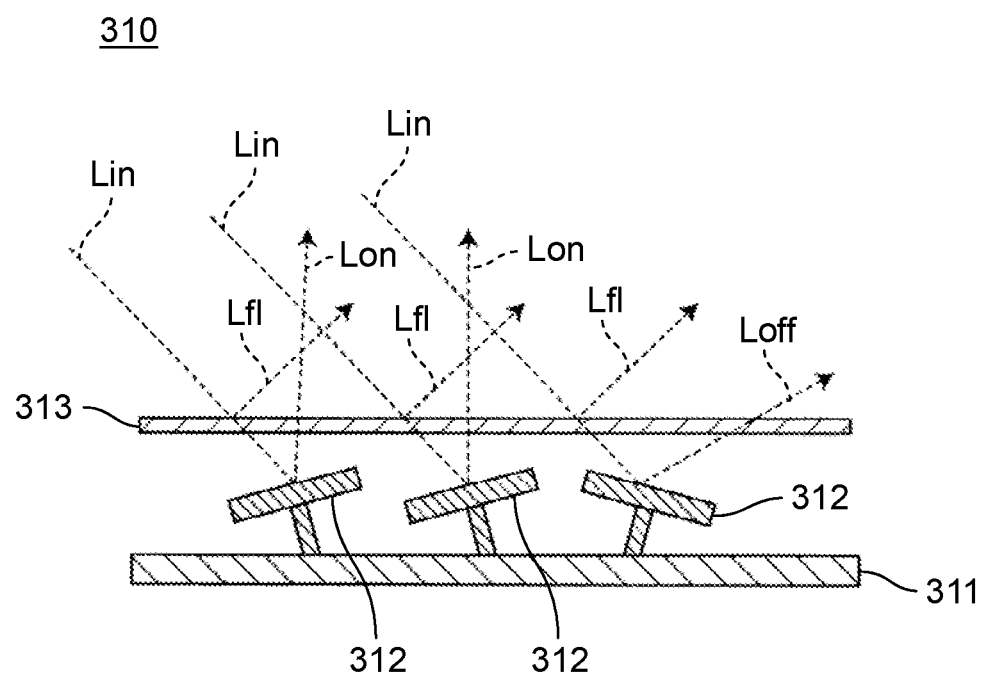
FIG. 4 is a detailed cross-sectional view illustrating a relationship between incident light and reflected light in the DMD in FIG. 2.

FIG. 4 is a detailed cross-sectional view illustrating a relationship between incident light and reflected light in DMD 310 in FIG. 2. In FIG. 4, DMD 310 includes substrate 311, a plurality of micromirrors 312, and cover glass 313. Substrate 311 and cover glass 313 reflect a part of incident light Lin as specular reflected light Lfl.

Each of micromirrors 312 selectively switches between on (state of leaning to the left in FIG. 4) and off (state of leaning to the right in FIG. 4) according to the input video signal, and reflects incident light Lin transmitted through cover glass 313. When micromirror 312 is on, incident light Lin is reflected toward the entrance pupil of projection lens 331 as on-light Lon, and is projected from projection lens 331 as video light. When micromirror 312 is off, incident light Lin is reflected toward a region other than the entrance pupil of projection lens 331 as off-light Loff, and then absorbed by light blocking plate 400, or reflected by light blocking plate 400 and absorbed by heat dissipation plate 500, as described above. Note that on-light Lon reflected from DMD 310 toward the entrance pupil of projection lens 331 is an example of "video light" in the present disclosure.

Figure 5:
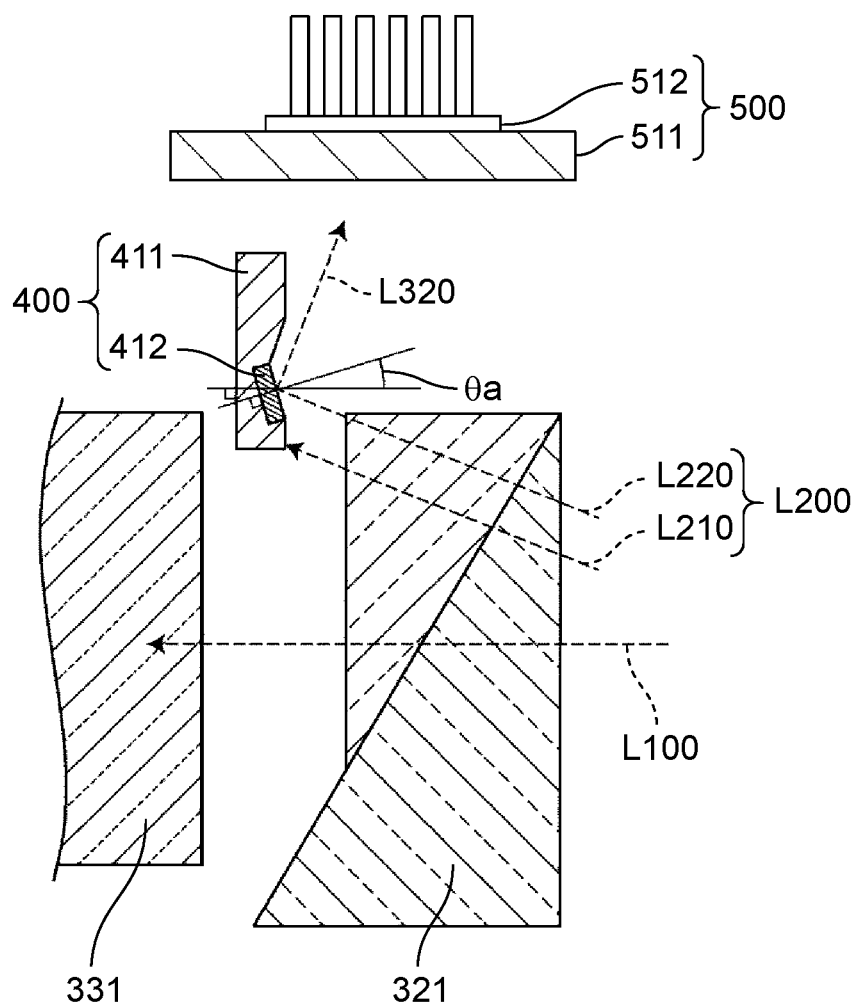
FIG. 5 is a cross-sectional view illustrating a detailed configuration example of a projection optical system in FIG. 2.

FIG. 5 is a cross-sectional view illustrating a detailed configuration example of projection optical system 300 in FIG. 2. In FIG. 5, light blocking plate 400 includes light blocking portion 411 (first light blocking member) and reflector 412. Light blocking portion 411 is subjected to a blackening treatment by coating, plating, or the like. Light blocking portion 411 absorbs and converts a part of the incident unnecessary light into heat, thereby converting light energy into thermal energy. Light blocking portion 411 has, for example, a reflectance of 20% or less which is so low that the reflected light is negligible. Reflector 412 has a reflectance of, for example, 80% or more which is so high that the absorbed light is negligible. In addition, reflector 412 is disposed so as to be inclined at inclination angle θa with respect to light blocking plate 400 in the direction of heat dissipation plate 500.

In FIG. 5, heat dissipation plate 500 (heat dissipation member) includes light blocking portion 511 (second light blocking portion) and heat dissipation fin 512 (heat dissipator). Similar to light blocking portion 411, light blocking portion 511 is subjected to a blackening treatment, and has a reflectance which is so low that the reflected light is negligible. Heat dissipation fin 512 is made of a material having high thermal conductivity, and dissipates heat from adjacent light blocking portion 511 to the outside air.

An operation of projection video display device 101 configured as described above will be described with reference to FIGS. 5 and 6. In FIG. 5, on-light L100 indicates on-light Lon from DMD 310 (not illustrated). On-light L100 is perpendicularly incident on total internal reflection prism 321, passes through total internal reflection prism 321, and enters projection lens 331 without changing the direction. As a result, on-light L100 is projected on the screen to display video 102.

Light that is unnecessary for projection lens 331 and that includes off-light Loff and specular reflected light Lfl from DMD 310 are collectively referred to as unnecessary light L200. Unnecessary light L200 is transmitted through total internal reflection prism 321 and enters light blocking plate 400. In FIG. 5 and subsequent figures, a portion of unnecessary light L200 that enters light blocking portion 411 of light blocking plate 400 is denoted by unnecessary light L210, and a portion that enters reflector 412 is denoted by unnecessary light L220.

Unnecessary light L210 passes through total internal reflection prism 321 and enters light blocking portion 411 of light blocking plate 400. Since light blocking portion 411 has a low reflectance, unnecessary light L210 is absorbed by light blocking portion 411 and converted into heat. The heat converted from unnecessary light L210 is transmitted through light blocking portion 411 and dissipated from the surface of light blocking portion 411 to the outside air.

Unnecessary light L220 passes through total internal reflection prism 321 and enters reflector 412 of light blocking plate 400. Since reflector 412 has high reflectance, unnecessary light L220 is reflected by reflector 412 and enters light blocking portion 511 of heat dissipation plate 500 as reflected light L320. Since light blocking portion 511 has low reflectance, reflected light L320 is absorbed by light blocking portion 511 and converted into heat. Heat converted from reflected light L320 (unnecessary light L220) is transmitted through light blocking portion 511 and heat dissipation fin 512, and is dissipated from their surfaces to the outside air.

Figure 6:
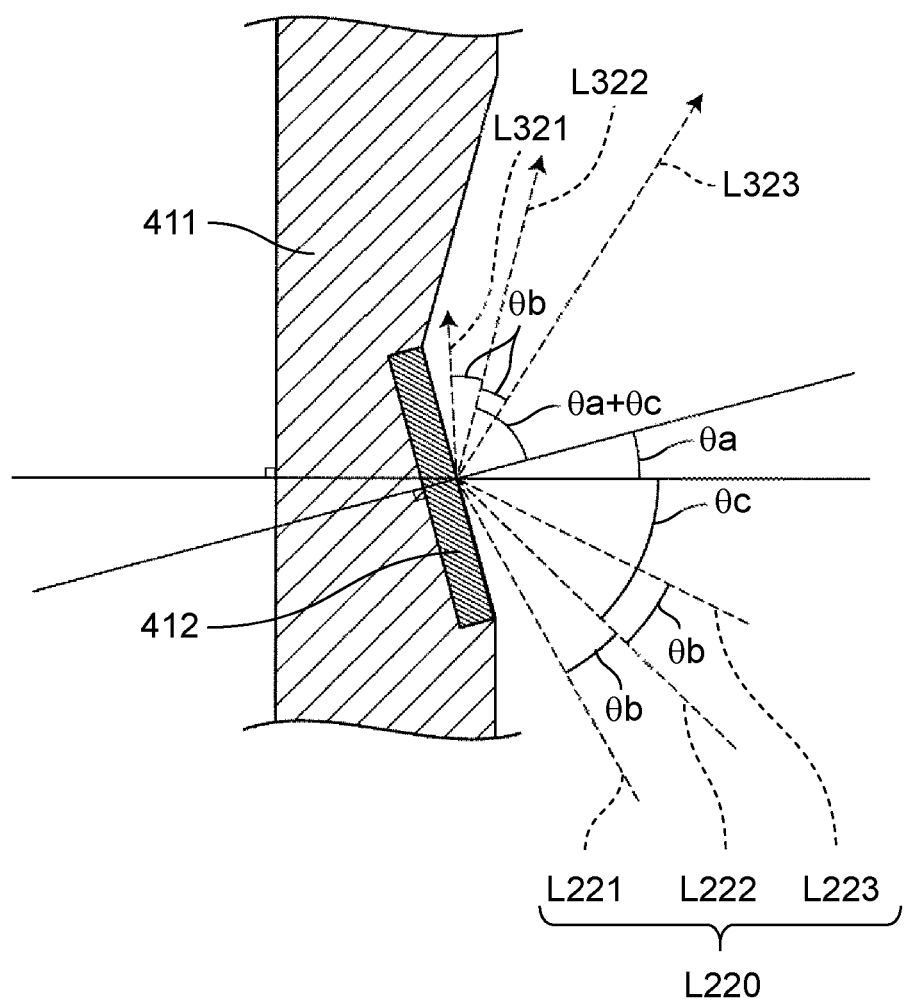
FIG. 6 is an enlarged view of a light blocking plate in FIG. 5.

FIG. 6 is an enlarged view of light blocking plate 400 illustrated in FIG. 5. In FIG. 6, it is assumed that unnecessary light L220 entering reflector 412 of light blocking plate 400 has a divergence angle of θb, and light flux L222 at the center of unnecessary light L220 is incident on light blocking plate 400 at incidence angle θc with respect to light blocking plate 400. In this case, light flux L222 enters reflector 412 at incidence angle of (θa+θc), because reflector 412 is disposed to be inclined at inclination angle θa with respect to light blocking plate 400. Therefore, reflected light L322 with respect to light flux L222 is reflected at a reflection angle of (θa+θc).

In FIG. 6, in unnecessary light L220, light flux L221 having the largest incidence angle has an incidence angle of (θa+θc+θb) and is reflected by reflector 412 to be converted into reflected light L321. In addition, in unnecessary light L220, light flux L223 having the smallest incidence angle has an incidence angle of (θa+θc−θb) and is reflected by reflector 412 to be converted into reflected light L323. As illustrated in FIG. 6, reflected light L321 is absorbed by light blocking portion 411 of light blocking plate 400 and converted into heat.

As described above, projection video display device 101 according to the first exemplary embodiment absorbs a portion of off-light Loff and specular reflected light Lfl (unnecessary light) from digital mirror device (DMD) 310 by light blocking portion 411 of light blocking plate 400, and absorbs another portion thereof by heat dissipation plate 500 after reflecting the same by reflector 412 of light blocking plate 400. Thus, unnecessary light L200 from DMD 310 is dispersed and absorbed at a plurality of points, whereby it is possible to prevent local temperature rise of light blocking plate 400 and to prevent deterioration of light blocking plate 400 or peripheral device members due to overheating.

In addition, unnecessary light L200 is absorbed by light blocking plate 400 and heat dissipation plate 500, and the reflected light from them is negligible as described above. Therefore, stray light incident on projection lens 331 can be reduced as compared with the related art, and excellent video display can be performed. Further, a part of the energy of unnecessary light L200 is propagated to heat dissipation plate 500 as light energy in the form of the reflected light reflected by reflector 412 of light blocking plate 400. Energy propagation performed in the form of light energy has higher energy propagation efficiency and less influence on other device members than energy propagation performed in the form of thermal energy (for example, heat conduction by a metal plate, forced convection of air by a fan, or the like).

Second Exemplary Embodiment

Figure 7:
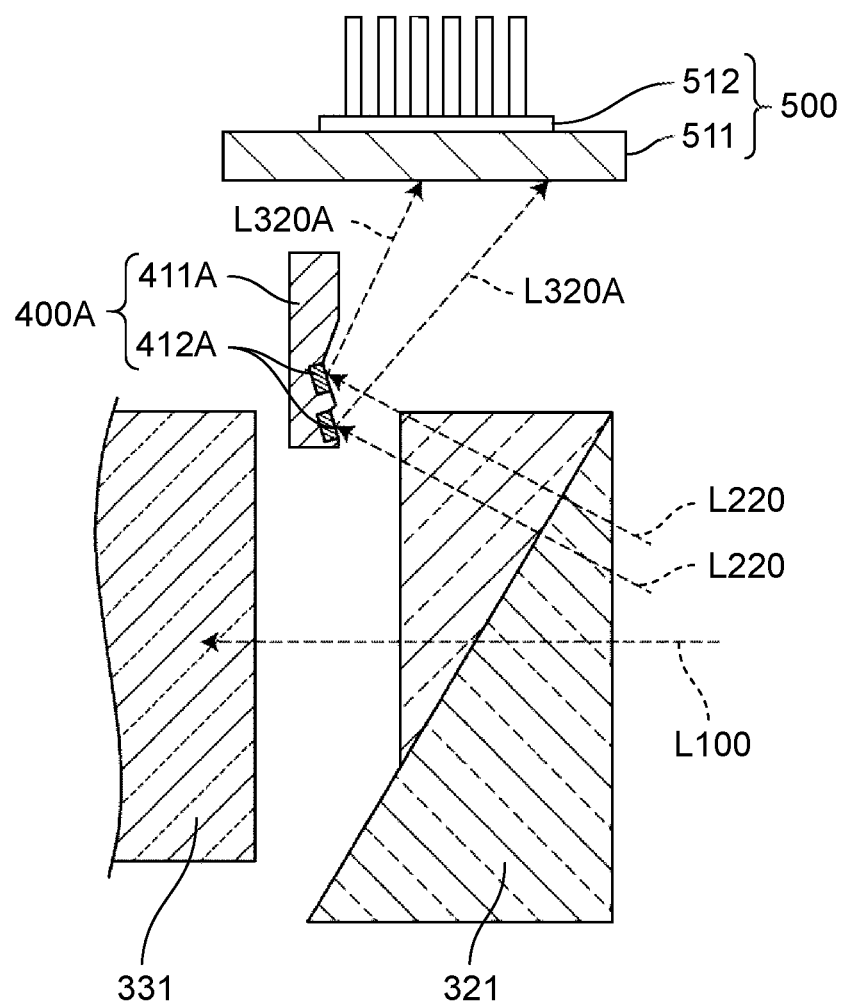
FIG. 7 is a cross-sectional view illustrating a detailed configuration example of a projection optical system according to a second exemplary embodiment.

FIG. 7 is a cross-sectional view illustrating a detailed configuration example of projection optical system 300A according to a second exemplary embodiment. In FIG. 7, light blocking plate 400A is different from light blocking plate 400 in the following points.

(1) Reflector 412A is divided into a plurality of regions.
(2) The plurality of reflectors 412A is arranged at different angles with respect to light blocking plate 400A.

In FIG. 7, unnecessary light L220 is incident on and reflected by one of the plurality of reflectors 412A, and is absorbed by light blocking portion 511 of heat dissipation plate 500 as reflected light L320A. At this time, it is possible to freely set the specific point of light blocking portion 511 (or light blocking portion 411A of light blocking plate 400A) on which reflected light L320A is incident by setting the plurality of reflectors 412A to have different angles. Therefore, reflected light L320A is absorbed at a plurality of points, which are separated from each other, on heat dissipation plate 500, so that local heat generation of heat dissipation plate 500 can be suppressed, and thus, efficient heat dissipation can be performed. Furthermore, space saving can be achieved by narrowing the region where reflected light L320A is incident.

Third Exemplary Embodiment

Figure 8:
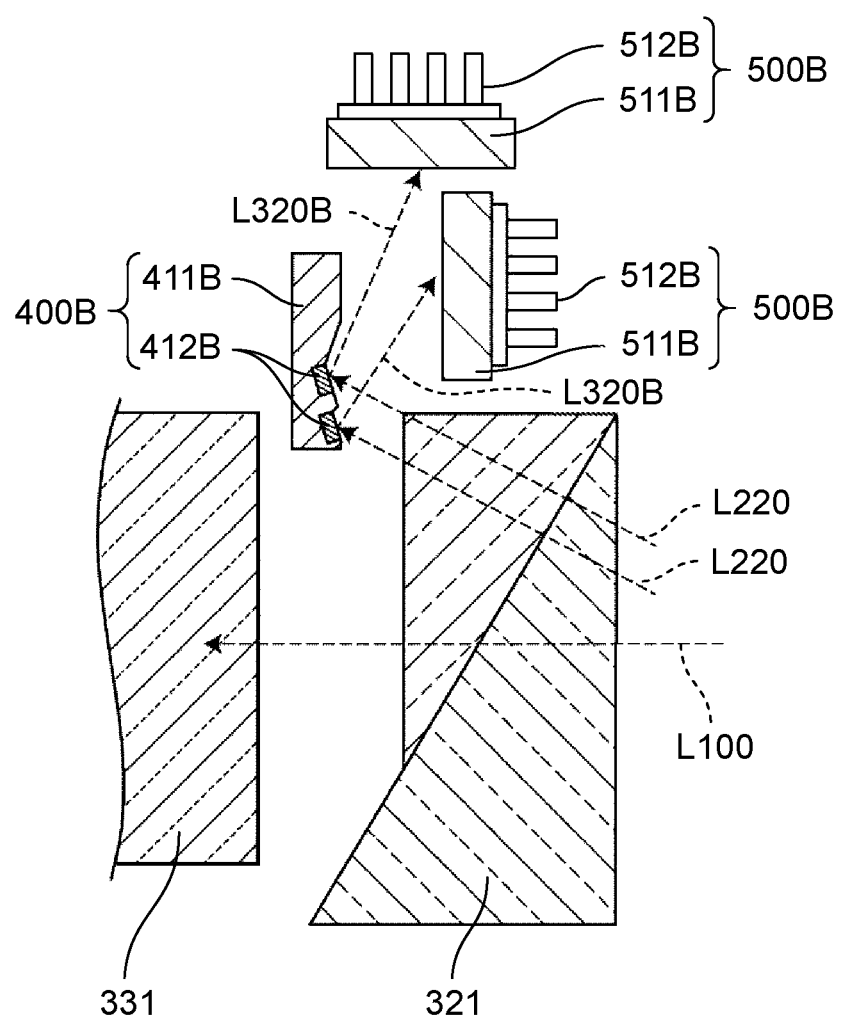
FIG. 8 is a cross-sectional view illustrating a detailed configuration example of a projection optical system according to a third exemplary embodiment.

FIG. 8 is a cross-sectional view illustrating a detailed configuration example of projection optical system 300B according to a third exemplary embodiment. In FIG. 8, projection optical system 300B is different from projection optical system 300A in the following point.

(1) A plurality of heat dissipation plates 500B is provided.

Each of heat dissipation plates 500B includes light blocking portion 511B and heat dissipation fin 512B. Heat dissipation plates 500B have the same shape, but may have different shapes.

In FIG. 8, light blocking plate 400B includes light blocking portion 411B and a plurality of reflectors 412B. Similar to reflectors 412A in FIG. 7, the plurality of reflectors 412B is set at different angles. Therefore, reflected light L320B obtained by reflecting unnecessary light L220 is incident on and absorbed by light blocking portions 511B of different heat dissipation plates 500B. Thus, it is possible to suppress local heat generation of heat dissipation plates 500B by dividing the region where reflected light L320B is incident into a plurality of portions and dissipating heat from the plurality of portions. In addition, a degree of freedom of arrangement of the plurality of heat dissipation plates 500B is higher than that in the first and second exemplary embodiments, and projection video display device 101 can be entirely downsized by adjusting a positional relationship with other device members.

Fourth Exemplary Embodiment

Figure 9:
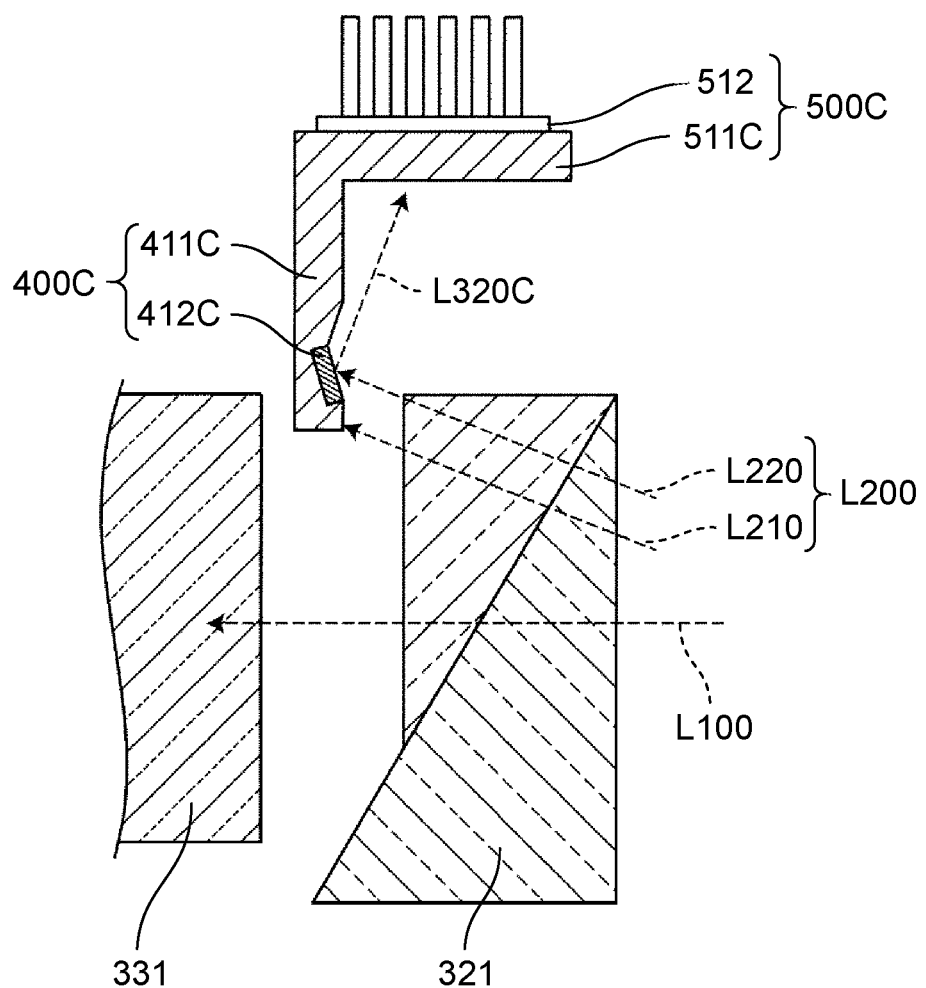
FIG. 9 is a cross-sectional view illustrating a detailed configuration example of a projection optical system according to a fourth exemplary embodiment.

FIG. 9 is a cross-sectional view illustrating a detailed configuration example of projection optical system 300C according to a fourth exemplary embodiment. In FIG. 9, projection optical system 300C is different from projection optical system 300 in FIG. 5 in the following point.

(1) Light blocking plate 400C and heat dissipation plate 500C are integrated.

Light blocking plate 400C includes light blocking portion 411C and reflector 412C. Heat dissipation plate 500C includes light blocking portion 511C and heat dissipation fin 512.

In FIG. 9, unnecessary light L210 is incident on and absorbed by light blocking portion 411C of light blocking plate 400C, and is converted into heat. This heat is transferred to light blocking portion 511C of heat dissipation plate 500C via light blocking portion 411C, and is efficiently dissipated using heat dissipation fin 512. In addition, reflected light L320C obtained by reflecting unnecessary light L220 is incident on and absorbed by light blocking portion 511C, and is efficiently dissipated using heat dissipation fin 512. As a result, it is possible to obtain a higher heat dissipation effect than projection optical system 300 with a smaller number of components than projection optical system 300.

Fifth Exemplary Embodiment

Figure 10:
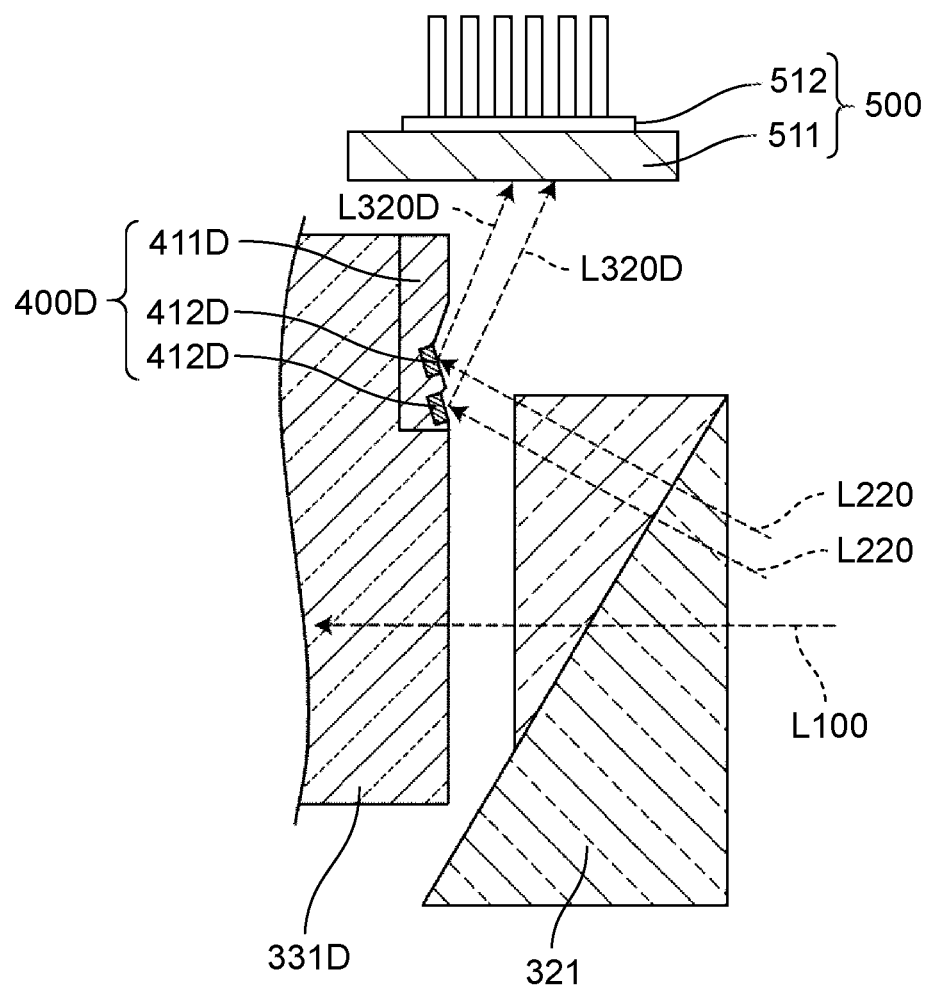
FIG. 10 is a cross-sectional view illustrating a detailed configuration example of a projection optical system according to a fifth exemplary embodiment.

FIG. 10 is a cross-sectional view illustrating a detailed configuration example of projection optical system 300D according to a fifth exemplary embodiment.

In FIG. 10, projection optical system 300D is different from projection optical system 300 in FIG. 5 in that light blocking plate 400D and projection lens 331D are integrated. Light blocking plate 400D includes light blocking portion 411D and reflector 412D.

Unnecessary light L220 is incident on and reflected by reflector 412D, and is absorbed by light blocking portion 511 as reflected light L320D.

As a result, the same effect as that of projection optical system 300 can be obtained with a smaller number of components than projection optical system 300.

Sixth Exemplary Embodiment

Figure 11:
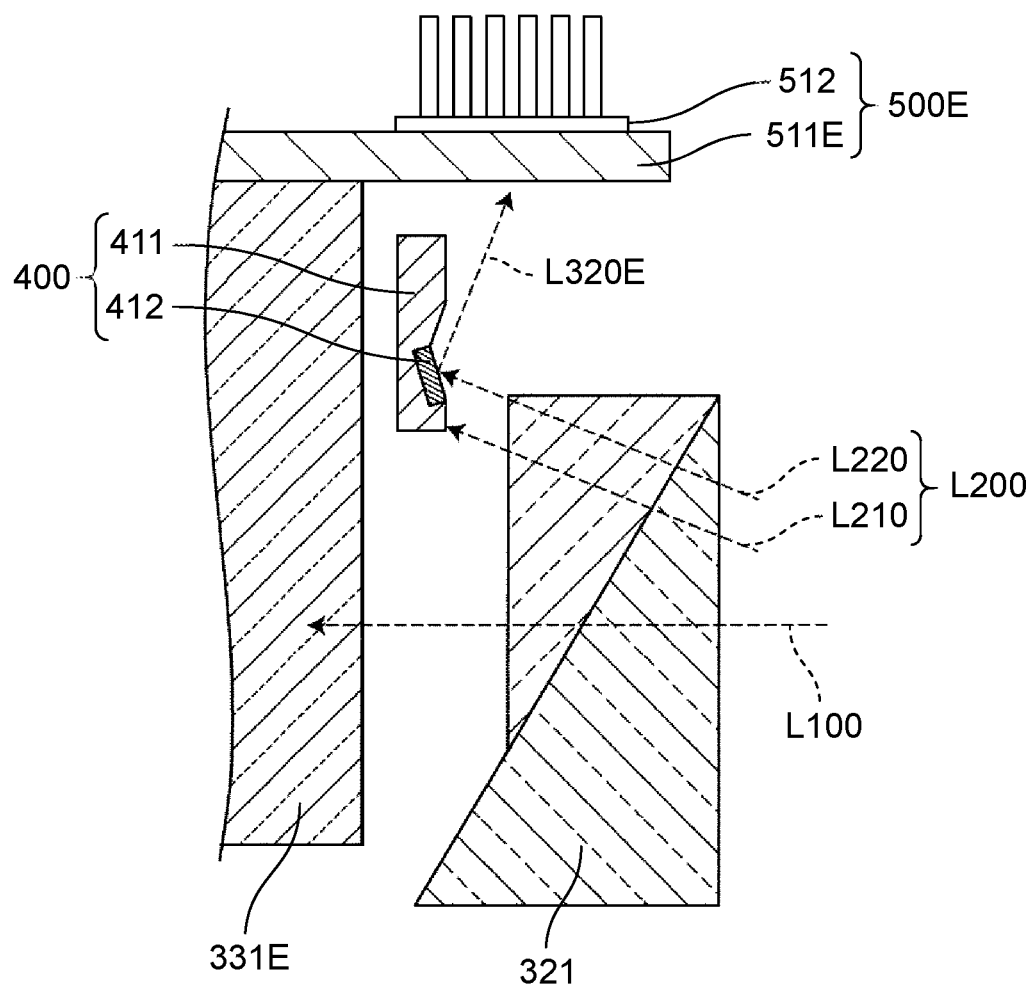
FIG. 11 is a cross-sectional view illustrating a detailed configuration example of a projection optical system according to a sixth exemplary embodiment.

FIG. 11 is a cross-sectional view illustrating a detailed configuration example of projection optical system 300E according to a sixth exemplary embodiment. Projection optical system 300E in FIG. 11 is different from projection optical system 300 in FIG. 5 in that heat dissipation plate 500E and projection lens 331E are integrated. Heat dissipation plate 500E includes light blocking portion 511E and heat dissipation fin 512.

Unnecessary light L220 is incident on and reflected by reflector 412, and is absorbed by light blocking portion 511E as reflected light L320E.

As a result, the same effect as that of projection optical system 300 can be obtained with a smaller number of components than projection optical system 300 illustrated in FIG. 5.

Seventh Exemplary Embodiment

Figure 12:
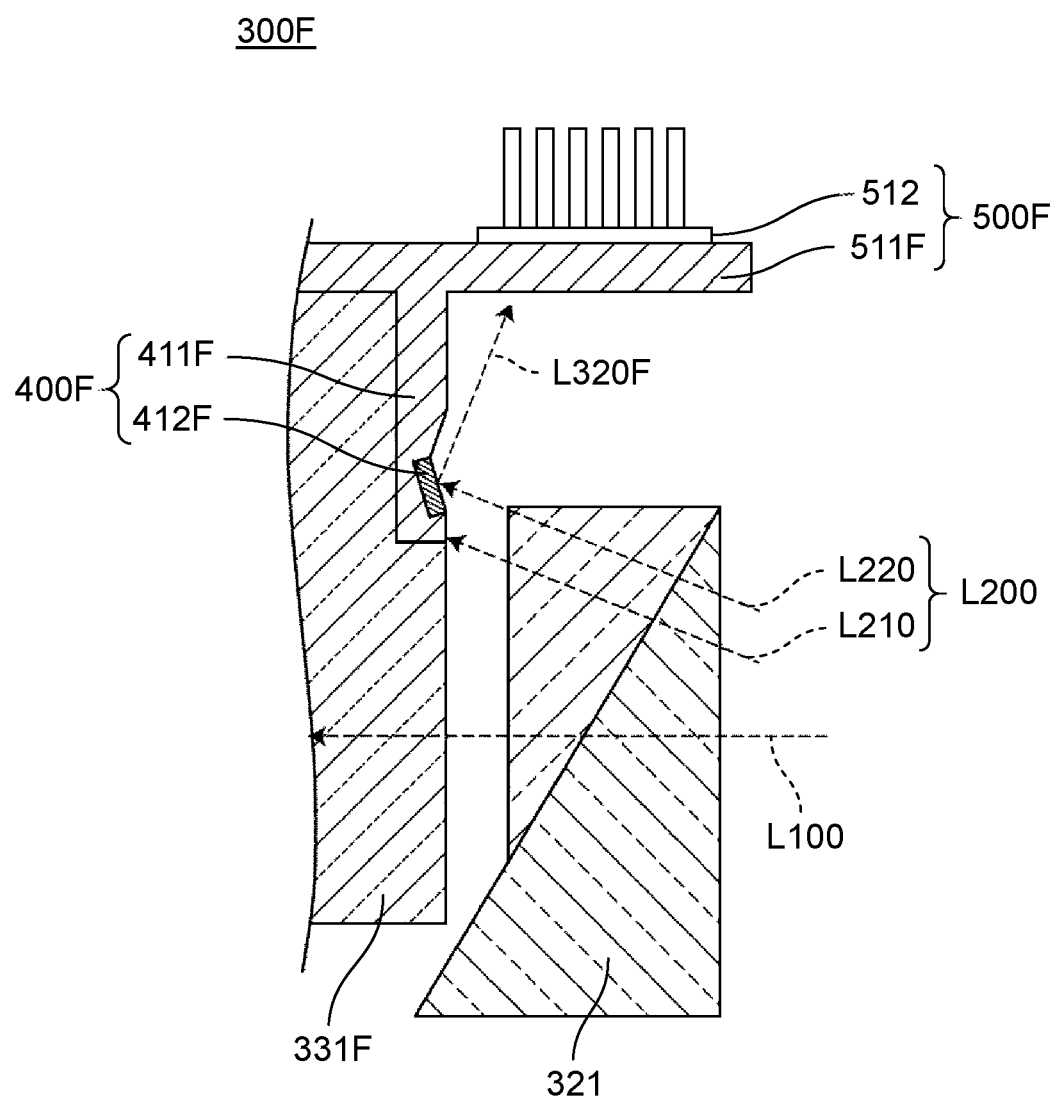
FIG. 12 is a cross-sectional view illustrating a detailed configuration example of a projection optical system according to a seventh exemplary embodiment.

FIG. 12 is a cross-sectional view illustrating a detailed configuration example of projection optical system 300F according to a seventh exemplary embodiment. Projection optical system 300F in FIG. 12 is different from projection optical system 300C in FIG. 9 in that heat dissipation plate 500F, light blocking plate 400F, and projection lens 331F are integrated.

Light blocking plate 400F includes light blocking portion 411F and reflector 412F. Heat dissipation plate 500F includes light blocking portion 511F and heat dissipation fin 512.

Unnecessary light L210 is incident on and absorbed by light blocking portion 411F, and is converted into heat. This heat is transferred to light blocking portion 511F via light blocking portion 411F, and is efficiently dissipated using heat dissipation fin 512. In addition, reflected light L320F obtained by reflecting unnecessary light L220 is incident on and absorbed by light blocking portion 511F, and is efficiently dissipated using heat dissipation fin 512.

As a result, the same effect as those of projection optical systems 300 and 300A to 300E illustrated in FIGS. 5 and 7 to 10 can be obtained with a smaller number of components than projection optical systems 300 and 300A to 300E.

Eighth Exemplary Embodiment

Figure 13A:
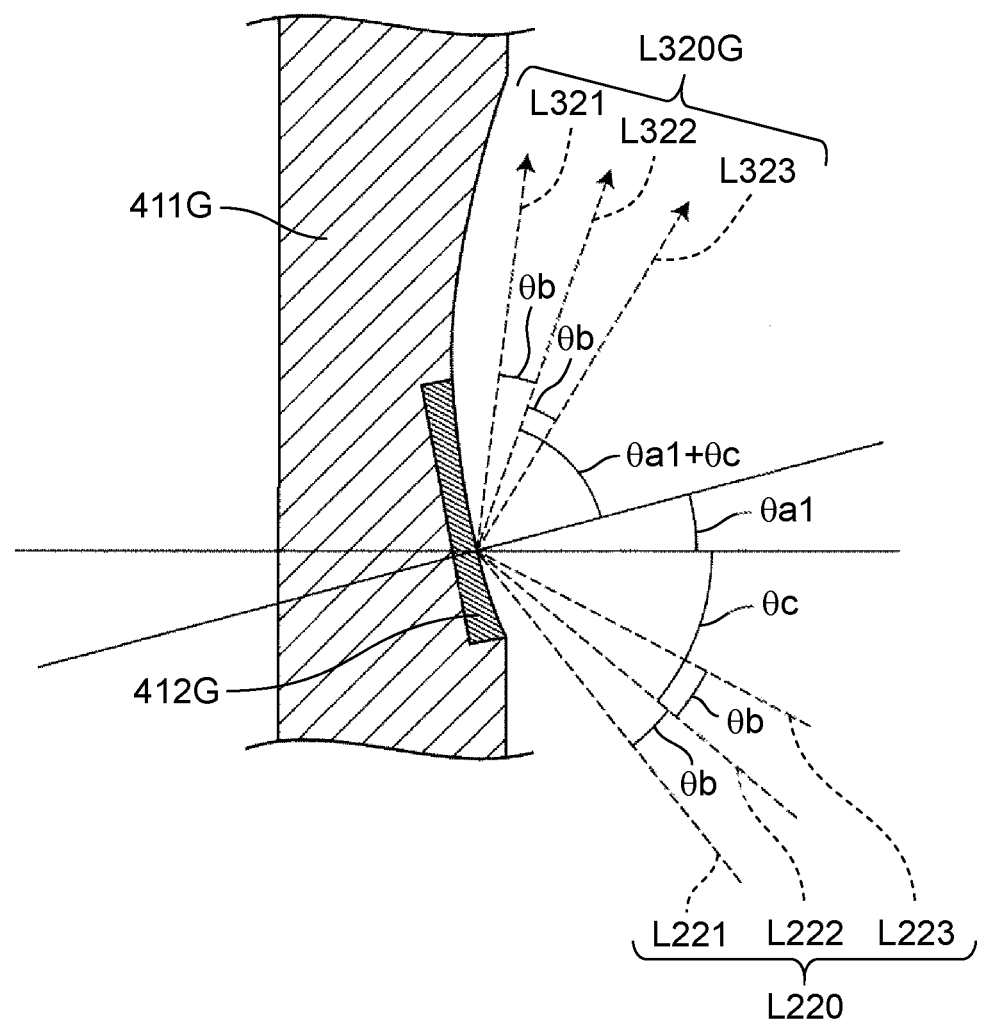
FIG. 13A is a cross-sectional view illustrating a detailed configuration example of a light blocking plate of a projection optical system according to an eighth exemplary embodiment.
Figure 13B:
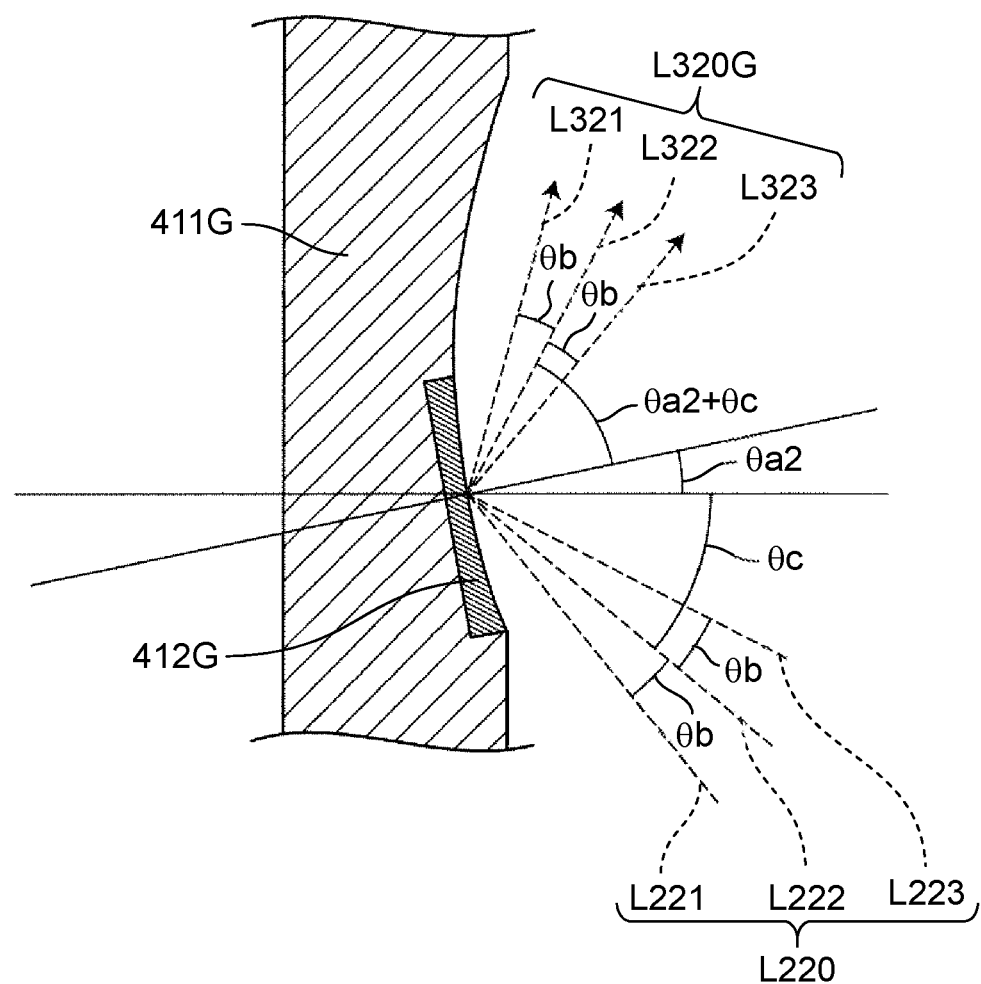
FIG. 13B is a cross-sectional view illustrating a detailed configuration example of the light blocking plate of the projection optical system according to the eighth exemplary embodiment.
Figure 13C:
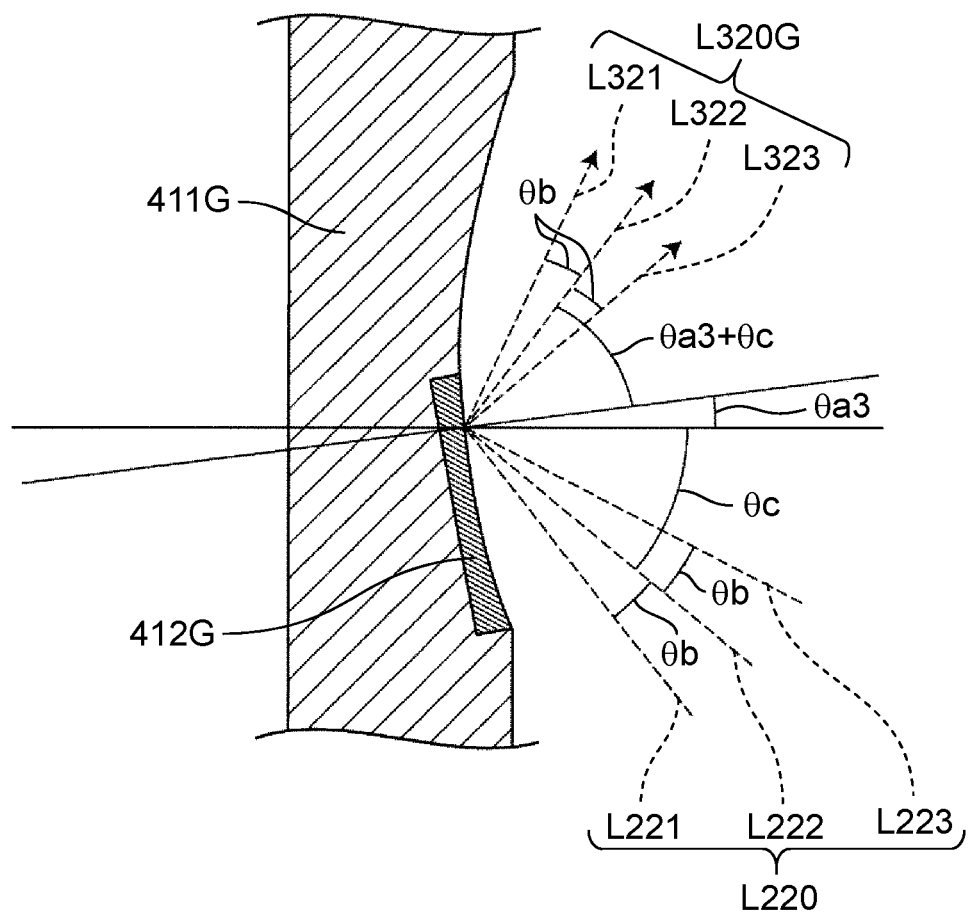
FIG. 13C is a cross-sectional view illustrating a detailed configuration example of the light blocking plate of the projection optical system according to the eighth exemplary embodiment.

FIGS. 13A to 13C are cross-sectional views illustrating a detailed configuration example of light blocking plate 400G of projection optical system 300G according to an eighth exemplary embodiment. In FIG. 13A, an unillustrated portion of projection optical system 300G is similar to those of projection optical systems 300 in the first to seventh exemplary embodiments.

Light blocking plate 400G in FIG. 13A includes light blocking portion 411G and reflector 412G. Light blocking plate 400G is different from light blocking plate 400 in FIG. 5 in that reflector 412G has a concave surface. FIG. 13A illustrates optical paths of unnecessary light L220 incident on the lower part of reflector 412G of light blocking plate 400G and reflected light L320G obtained by reflecting unnecessary light L220.

In FIG. 13A, it is assumed that, as in FIG. 6, unnecessary light L220 is incident on light blocking plate 400G at incidence angle θc and has divergence angle θb. In FIG. 13A, in unnecessary light L220, center light is indicated by light flux L222, light having the largest incidence angle is indicated by light flux L221, and light having the smallest incidence angle is indicated by light flux L223. In addition, it is assumed that the curved surface of reflector 412G is inclined at angle θa1 with respect to light blocking plate 400G at a point where unnecessary light L220 is incident.

In this case, light flux L221 having the largest incidence angle enters reflector 412G at an incidence angle of (θa1+θc+θb), and is reflected at a reflection angle (reflected light L321) same as the incidence angle. Similarly, light flux L222, which is the center light, is incident on and reflected (reflected light L322) by reflector 412G at an incidence angle of (θa1+θc) and a reflection angle same as the incidence angle. In addition, light flux L223 having the smallest incidence angle is incident on and reflected (reflected light L323) by reflector 412G at an incidence angle of (θa1+θc−θb) and a reflection angle same as the incidence angle.

FIG. 13B is a cross-sectional view illustrating optical paths in a case where unnecessary light L200 is incident on the vicinity of the center of reflector 412G in FIG. 13A. FIG. 13B is a diagram similar to FIG. 13A except that the curved surface of reflector 412G is inclined at angle θa2 with respect to light blocking plate 400G at the point where unnecessary light L220 is incident. In addition, FIG. 13C is a cross-sectional view illustrating optical paths in a case where unnecessary light L200 is incident on the upper part of reflector 412G in FIG. 13A. FIG. 13C is a diagram similar to FIG. 13A except that the curved surface of reflector 412G is inclined at angle θa3 with respect to light blocking plate 400G at the point where unnecessary light L220 is incident. Note that the following equation is established between angles θa1, θa2, and θa3.

$$\theta a1 > \theta a2 > \theta a3$$

Therefore, an angle between light flux L223 having the smallest incidence angle that enters the lower part of reflector 412G and light flux L221 having the largest incidence angle that enters the upper part of reflector 412G is smaller by (θa1−θa3) than the angle between light flux L223 having the smallest incidence angle that enters reflector 412 and light flux L221 having the largest incidence angle that enters reflector 412 when they are reflected by reflector 412G. In this manner, when reflector 412G has a concave surface, the divergence angle of unnecessary light L220 can be reduced. Conversely, if reflector 412G has a convex surface, the divergence angle of unnecessary light L220 can be increased. As described above, by using a curved surface having a predetermined curvature for reflector 412G, it is possible to adjust the distribution of reflected light L320G entering heat dissipation plate 500 according to the heat dissipation characteristics of heat dissipation plate 500, such as having a higher heat dissipation efficiency with nearness to the center of heat dissipation plate 500.

Other Exemplary Embodiments

The first to seventh exemplary embodiments describe examples in which reflectors 412 and 412A to 412F are inclined at inclination angle θa. However, even in a case where reflectors are not inclined with inclination angle θa of zero, it is possible to obtain an effect of dispersing heat generation points by reflecting a part of unnecessary light and absorbing the same by a heat dissipation plate. Further, light blocking plates 400 and 400A to 400G are examples of a "light blocking member" in the present disclosure, and heat dissipation plates 500, 500C, 500E, and 500F are examples of a "heat dissipation member" in the present disclosure.

INDUSTRIAL APPLICABILITY

The present disclosure is applicable to a projection video display device such as a projector.

REFERENCE MARKS IN THE DRAWINGS 101 projection video display device
102 video
200 illumination optical system 300, 300A, 300B, 300C, 300D, 300E, 300F, 300G projection optical system
310 digital mirror device (DMD)
311 substrate
312 micromirror
313 cover glass
400, 400A, 400B, 400C, 400D, 400F, 400G light blocking plate
411, 411A, 411B, 411C, 411D, 411F, 411G light blocking portion
412, 412A, 412B, 412C, 412D, 412F, 412G reflector
500, 500B, 500C, 500E, 500F heat dissipation plate
511, 511B, 511C, 511E, 511F light blocking portion
512, 512B heat dissipation fin
Lin incident light
Lon, L100 on-light
Loff off-light
Lfl specular reflected light

The invention claimed is:

1. A light blocking member for a projection video display device provided with an optical system that projects video light and a projection lens on which the video light is incident, the light blocking member being disposed between the optical system and the projection lens, the light blocking member comprising:
a first light blocking portion that absorbs and converts into heat a part of unnecessary light unnecessary for the projection lens in the video light; and
a reflector that reflects, as reflected light, light that is a part of the unnecessary light and that is not absorbed by the first light blocking portion.

2. The light blocking member according to claim 1, wherein the reflector is disposed to be inclined at a predetermined inclination angle with respect to the light blocking member.

3. The light blocking member according to claim 1, wherein the reflector has a curved surface having a predetermined curvature.

4. The light blocking member according to claim 1, comprising a plurality of reflectors each being the reflector.

5. The light blocking member according to claim 4, wherein the plurality of reflectors has predetermined inclination angles different from each other, and reflects the light not absorbed by the first light blocking portion in different directions, the predetermined inclination angles each being the predetermined inclination angle.

6. A projection video display device comprising:
an optical system that projects video light;
a projection lens on which the video light is incident; and
the light blocking member according to claim 1.

7. The projection video display device according to claim 6, wherein the projection lens and the light blocking member are made of a same material.

8. The projection video display device according to claim 6, further comprising a heat dissipation member including:
a second light blocking portion that absorbs reflected light reflected by the reflector of the light blocking member; and
a heat dissipator that dissipates heat of the second light blocking portion to outside air.

9. The projection video display device according to claim 8, wherein at least two of the light blocking member, the heat dissipation member, and the projection lens are made of a same material.

* * * * *